(12) United States Patent
Schreter et al.

(10) Patent No.: US 9,892,031 B2
(45) Date of Patent: Feb. 13, 2018

(54) LOCK-FREE SCALABLE FREE LIST

(75) Inventors: Ivan Schreter, Malsch (DE); Daniel Booss, Wiesloch (DE)

(73) Assignee: SAP SE, Walldorf (DE)

( * ) Notice: Subject to any disclaimer, the term of this patent is extended or adjusted under 35 U.S.C. 154(b) by 110 days.

(21) Appl. No.: 13/290,912

(22) Filed: Nov. 7, 2011

(65) Prior Publication Data

US 2013/0117331 A1 May 9, 2013

(51) Int. Cl.
*G06F 17/30* (2006.01)
*G06F 12/02* (2006.01)
*G06F 9/50* (2006.01)

(52) U.S. Cl.
CPC .......... *G06F 12/023* (2013.01); *G06F 9/5016* (2013.01); *G06F 9/5083* (2013.01); *G06F 12/0284* (2013.01)

(58) Field of Classification Search
USPC ........................................................ 707/803
See application file for complete search history.

(56) References Cited

U.S. PATENT DOCUMENTS

| | | | |
|---|---|---|---|
| 6,449,614 B1 * | 9/2002 | Marcotte | |
| 2002/0032835 A1 * | 3/2002 | Li | G06F 3/0608 711/114 |
| 2002/0120716 A1 * | 8/2002 | Raghunathan et al. | 709/219 |
| 2003/0056032 A1 * | 3/2003 | Micalizzi et al. | 710/5 |
| 2005/0240748 A1 * | 10/2005 | Yoder | G06F 12/0607 711/170 |
| 2005/0273567 A1 * | 12/2005 | Blandy | 711/170 |
| 2007/0288708 A1 * | 12/2007 | Saha et al. | 711/159 |

* cited by examiner

*Primary Examiner* — Fred I Ehichioya
*Assistant Examiner* — Johnese Johnson
(74) *Attorney, Agent, or Firm* — Mintz Levin Cohn Ferris Glovsky and Popeo, P.C.

(57) ABSTRACT

A plurality of free list data structures are maintained in a multi-processor computing system that each correspond to one processor of the multi-processor computing system and that each comprise an ordered queue of processor-specific items. Thereafter, a number of processor-specific items allocated to each free list data structure is calculated. Processor-specific items allocated to a first of the free list data structures are moved to a second of the free list data structures when the number of calculated processor-specific items in the first free data structure exceeds a first threshold. In addition, processor-specific items allocated to the second of the free list data structures are moved to the first of the free list data structures when the number of calculated processor-specific items in the first free data structure is below a second threshold. Related apparatus, systems, techniques and articles are also described.

18 Claims, 3 Drawing Sheets

LOCK-FREE SCALABLE FREE LIST

TECHNICAL FIELD

The subject matter described herein relates to selectively allocating processor-specific items among different free list data structures.

BACKGROUND

Lists or queues of free items (referred to sometimes as free lists or free list data structures) are often employed to prevent allocating or deallocating resources such as memory. For example, generic memory allocators typically employ a singly-linked list of free items which can lead to significant numbers of L-2 processor cache misses on multiprocessor systems. Such L-2 processor cache misses can occur even when atomic, lock-free operations are used to manage items in such a list.

SUMMARY

In one aspect, a plurality of free list data structures are maintained in a multi-processor computing system. Each free list data structure corresponds to one processor of the multi-processor computing system and each free list data structure comprises an ordered queue of processor-specific items. Thereafter, a number of processor-specific items allocated to each free list data structure is calculated. Processor-specific items allocated to a first of the free list data structures are moved to a second of the free list data structures when the number of calculated processor-specific items in the first free data structure exceeds a first threshold. In addition, processor-specific items allocated to the second of the free list data structures are moved to the first of the free list data structures when the number of calculated processor-specific items in the first free data structure is below a second threshold.

In addition, a global free list data structure can be maintained. The global free list data structure can receiving processor-specific items from the plurality of free list data structures when such free list data structures have a number of processor-specific items above the first threshold and it can allocate items to the plurality of free list data structures when such free list data structures have a number of processor-specific items below the second threshold. In some implementations, the second of the free list data structures can be the global free list data structure.

The items in freelist can represent (i) free blocks in memory allocation algorithms, (ii) free internal state objects of job worker queues, and/or (iii) free I/O control blocks of an I/O subsystems. The processor-specific items can comprise arbitrary objects. Each free list data structure can comprise a last-in-first-out (LIFO) queue.

In an interrelated aspect, a plurality of free list data structures are maintained in a multi-processor computing system. Each free list data structure corresponds to one processor of the multi-processor computing system and each free list data structure comprises an ordered queue of processor-specific items. A number of processor-specific items allocated to each free list data structure are calculated. Based on this calculation, processor-specific items allocated to the free list data structures are moved to a global free list queue when a number of processor-specific items within a corresponding free list data structure exceeds a first threshold. Thereafter, items in the global free list queue are reassigned to free list data structures having a number of processor-specific items below a second threshold.

In a further interrelated aspect, a plurality of free list data structure pairs are maintained in a multi-processor computing system. Each free list data structure pair comprises a primary free list data structure and a secondary free list data structure and corresponds to one processor of the multi-processor computing system. In addition, each free list data structure comprises an ordered queue of processor-specific items. Later, it is determined, for a first of the free list data structure pairs, whether a first item is present in a corresponding first primary free list data structure. If the first item is present, then the first item is allocated. At least a portion of the processor-specific items in a corresponding first secondary free list data structure are moved to the first primary free list data structure if the first item is not present in the first primary free list data structure and the first secondary free list data structure includes at least two processor-specific items. In addition, items from a global list data structure queue of items are moved to the first primary free list data structure when the first secondary free list data structure includes a number of processor-specific items below a pre-defined threshold. The items in the global list data structure being selectively allocated to all of the primary free list data structures to effect load-balancing.

It can be determined, for a second of the free list data structure pairs, that a corresponding second primary free list data structure has a number of processor-specific items exceeding a second threshold. In response, at least one of the processor-specific items in the second primary free list data structure having the number of processor-specific items exceeding the first threshold is moved to a corresponding second secondary free list data structure. A new item is then pushed into the second primary free list data structure. At least a portion of processor-specific items in the second secondary free list data structure can also be moved to the global free list data structure.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The subject matter described herein provides many advantages. The subject matter described herein enables enhanced scalability as compared to mutual exclusion object (mutex) protected free lists and simple atomic last in, first out (LIFO) free lists. Moreover, the current subject matter optimizes the management of free items in critical paths used by algorithms requiring frequent use of constant-sized objects such as internal state objects of job worker queues, I/O subsystems, memory allocators and more.

The details of one or more variations of the subject matter described herein are set forth in the accompanying drawings and the description below. Other features and advantages of the subject matter described herein will be apparent from the description and drawings, and from the claims.

DETAILED DESCRIPTION

Free lists are data structures that can be used, for example, in various allocation and deallocation operations. One example is dynamic memory allocation in which a free list connects unallocated regions of memory together in a linked list, using the first word of each unallocated region as a pointer to the next. To free a particular region, the region needs to be linked to the free list. To allocate a particular region, such region would be removed from the end of the free list and used (this is because the free list is in a LIFO format). In addition to memory allocation, free lists can be used in other applications including, but not limited to internal state objects of job worker queues, an I/O subsystems operations (e.g., determining states of I/O requests, etc.).

Figure 1:
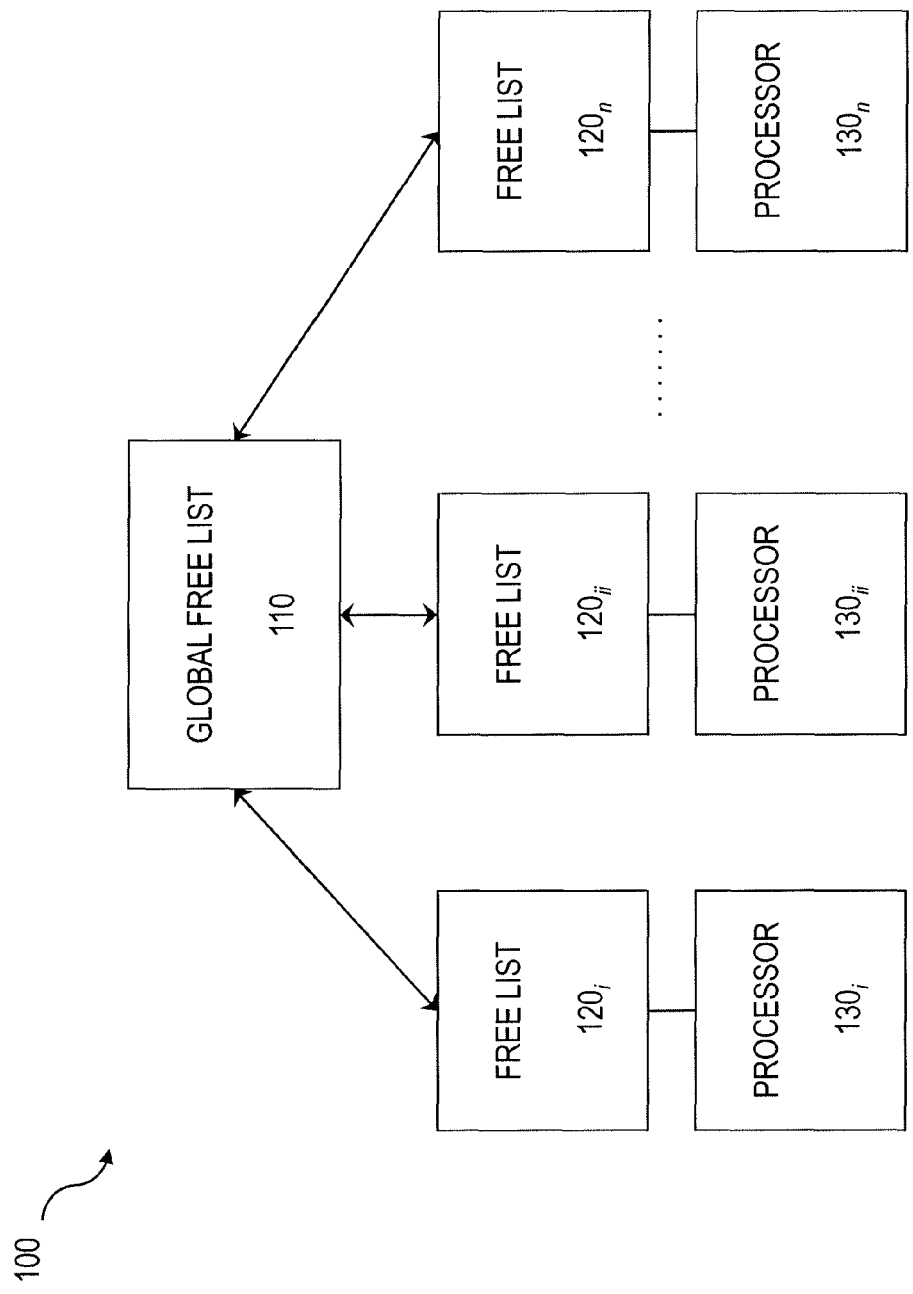
FIG. 1 is a first logic diagram illustrating an interrelationship among free list data structures and a global free list data structure.

FIG. 1 is a diagram illustrating an arrangement in which there is a single free list $120_{i\ldots n}$ per processor (e.g., central processing unit (CPU)) $130_{i\ldots n}$. With this arrangement, the free list is not held as a simple LIFO, but instead it is striped by processor $130_{i\ldots n}$ on which a corresponding thread currently runs. As such LIFO free lists $120_{i\ldots n}$ are CPU-private, operations on these free lists will not, in most cases, result in L2-cache misses. In addition, these free lists will not typically require arbitration via some central instance (such as central bus or NUMA interconnect, etc.).

In addition to the free lists $120_{i\ldots n}$, a global free list 110 can be provided. The global free list 110 can be of particular use if there are two threads running on different processors $130_{i\ldots n}$ that work in a "producer-consumer" relationship. In this case, the consumer thread would only fill items in the corresponding free list $120_{i\ldots n}$ and the producer thread would have to allocate new items all the time to the corresponding free list $120_{i\ldots n}$. To prevent this, a certain threshold can be defined based on a number of items in each free list $120_{i\ldots n}$ (a single threshold can be utilized across each free list $120_{i\ldots n}$ or they can be specific to a particular free list $120_{i\ldots n}$, etc.). If this number of items will get deallocated on a particular processor $130_{i\ldots n}$, the half of this amount will be moved to the global free list 110. Conversely, if the processor-local free list $120_{i\ldots n}$ becomes empty, it will be refilled by threshold/2 items taken from the global free list 110 and only if the global queue 110 is empty, new allocations need to be made. These allocations would also allocate threshold/2 items at once to prevent frequent calls to the allocator. In this way, the maximum theoretical memory amount waste is (threshold-1)*#processors items, which are kept in processor-local free list. It will be appreciated that various thresholds can be used with any aspect of the current subject matter and the current description should not be construed as requiring any specific thresholds (unless explicitly stated). Choice of threshold value influences the scalability of the algorithm, especially in boundary cases (like producer-consumer relationship). The higher the threshold, the less collisions on shared structures and thus better scalability. A compromise has to be found between scalability and memory overhead needed for keeping items in processor-local freelists. As an example, processor count could be taken for threshold.

Figure 2:
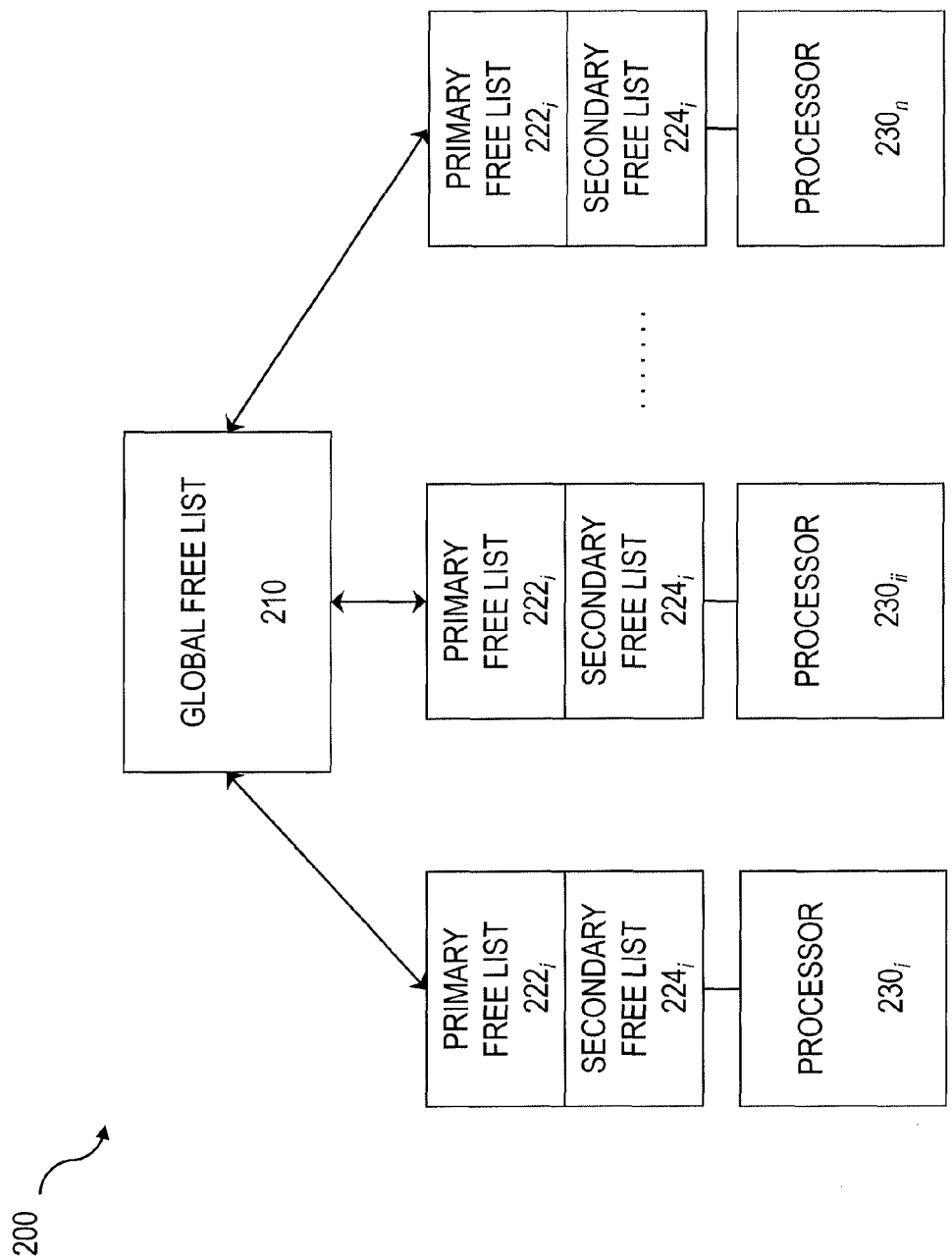
FIG. 2 is a second logic diagram illustrating an interrelationship among free list data structures and a global free list data structure.

In some implementations, there can be two or more free lists per processor. With reference to FIG. 2, each processor $230_{i\ldots n}$ has a pair of free lists, namely a corresponding a primary free list $222_{i\ldots n}$ and a secondary free list $224_{i\ldots n}$. The pair of free lists $222_{i\ldots n}/224_{i\ldots n}$ for any given processor $230_{i\ldots n}$ can be determined, for example, using a processor index or the like. In order to obtain/pop a particular processor-specific item, an instruction can be initiated to attempt to obtain such processor-specific item from a primary free list $222_{i\ldots n}$. If this attempt fails, then at least a portion of the corresponding secondary free list $224_{i\ldots n}$ is moved to the respective primary free list $222_{i\ldots n}$. In some cases, all processor-specific items except for one which will be returned to the caller are moved. At this point, a further attempt can be made to obtain the particular processor-specific item from the primary free list $222_{i\ldots n}$ (which now contains new processor-specific items moved from the secondary free list $224_{i\ldots n}$). In addition, in cases in which the secondary free list $224_{i\ldots n}$ is empty, then additional batch of processor-specific items can be obtained from a global free list 210 and moved to the primary free list $222_{i\ldots n}$. In some cases, the number of items moved from the global free list 210 to the corresponding primary free list $222_{i\ldots n}$ are limited by a threshold. In some cases, all but one of the items obtained from global free list are moved to the primary free list and the remaining item is returned to the caller. Items in the global freelist 210 are sometimes referred to herein as "items" while items in one of the other free lists $222_{i\ldots n}/224_{i\ldots n}$ (i.e., processor-specific freelists) are sometimes referred to herein as "processor-specific items".

In order to push a new processor-specific item to the free list, an appropriate processor $230_{i\ldots n}$ and its pair of free lists $222_{i\ldots n}/224_{i\ldots n}$ are identified (using, for example, a processor index, etc.). If after adding the new item the corresponding primary free list $222_{i\ldots n}$ would contain a number of items exceeding a threshold, then at least a portion of the items in the primary free list $222_{i\ldots n}$ are moved to the corresponding secondary free list $224_{i\ldots n}$ for that processor. Immediately prior to the items being moved to the secondary free list $224_{i\ldots n}$, at least a portion of the items in the secondary free list $224_{i\ldots n}$ can be moved to the global free list 210 (for example, to make room for the processor-specific items to be moved from the primary free list $222_{i\ldots n}$). Thereafter, the new processor-specific item can be pushed at the head of the primary free list $222_{i\ldots n}$.

Figure 3:
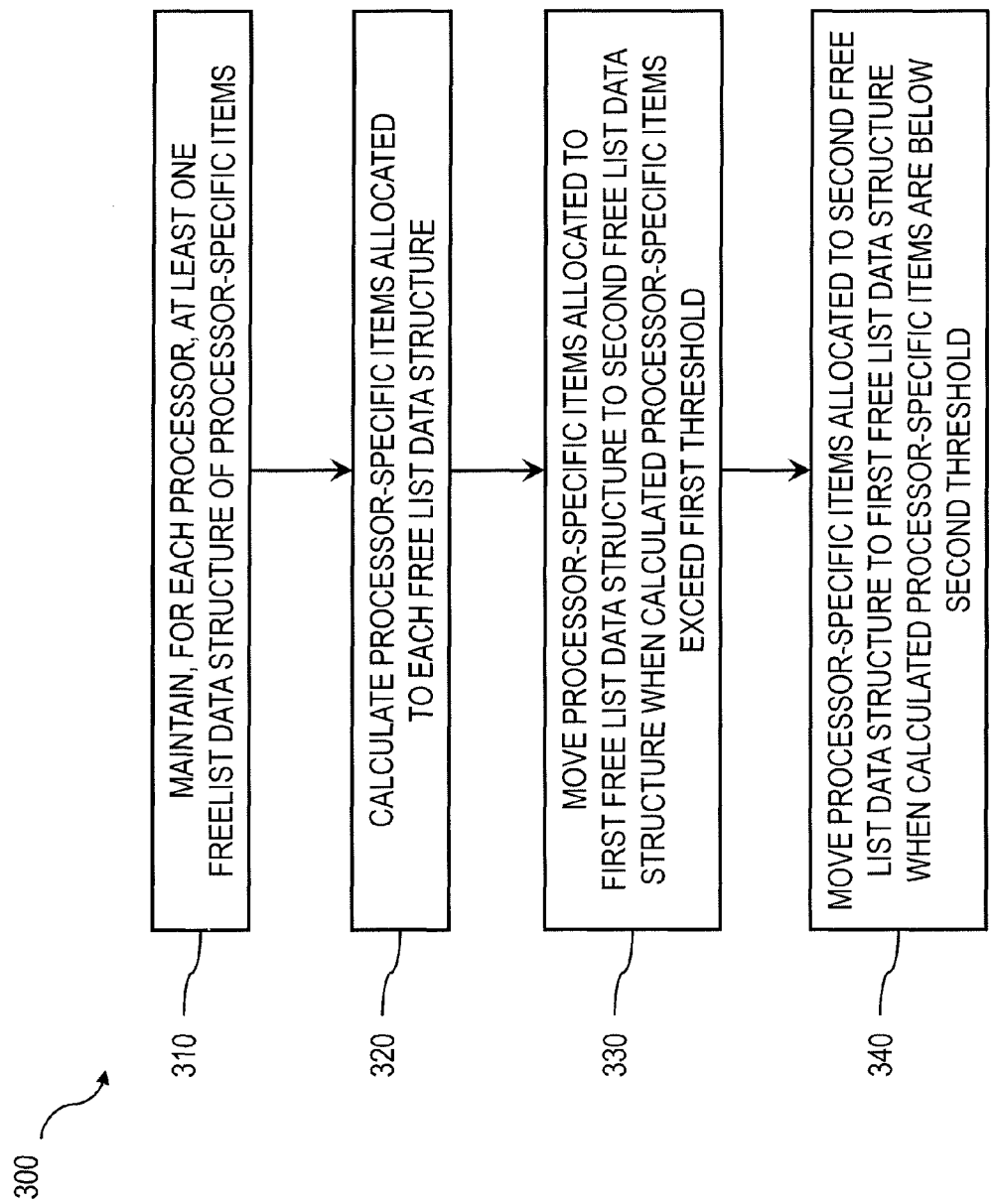
FIG. 3 is a process flow diagram illustrating reallocation of processor-specific items between different free list data structures.

FIG. 3 is a process flow diagram 300 in which, at 310, a plurality of free list data structure are maintained in a multi-processor computing system. Each free list data structure corresponds to one processor of the multi-processor computing system. Each free list data structure can comprise an ordered queue of processor-specific items. Thereafter, at 320, a number of processor-specific items allocated to each free list data structure can be calculated (this calculation can be performed continually or on a periodic basis). Processor-specific items allocated to a first of the free list data structures are, at 330, moved to a second of the free list data structures when the number of calculated processor-specific items in the first free data structure exceeds a first threshold. In addition, processor-specific items allocated to the second of the free list data structures are, at 340, moved to the first of the free list data structures when the number of calculated processor-specific items in the first free data structure is below a second threshold. In some cases, one or more of the free list data structures moves and/or receives items from a global free list data structure.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A non-transitory computer program product storing instructions that, when executed by at least one programmable processor, cause the at least one programmable processor to perform operations comprising:
maintaining, in a multi-processor computing system, a plurality of free list data structures implemented in a dynamic memory, each free list data structure being striped by, and corresponding to, a different processor of the multi-processor computing system, each free list data structure comprising an ordered queue of processor-specific items assigned to a corresponding processor of the multi-processor computing system, wherein each processor has a primary free list data structure and a secondary free list data structure;
calculating a number of processor-specific items allocated to each free list data structure;
moving processor-specific items allocated to a first of the free list data structures to a second of the free list data structures, when the number of calculated processor-specific items in the first free data structure exceeds a first threshold; and
moving processor-specific items allocated to the second of the free list data structures to the first of the free list data structures, when the number of calculated processor-specific items in the first free data structure is below a second threshold;
the first and second thresholds being determined based on a number of items in each free list data structure;
maintaining a global free list data structure;
wherein
upon determination that a first item is present in the first primary free list data structure, then the first item is allocated;
upon determination that the first item is not present in the first primary free list data structure and the first secondary free list data structure includes at least two processor-specific items, at least a portion of the processor-specific items in a corresponding first secondary free list data structure are moved to the first primary free list data structure, wherein at least one item from the global list data structure queue of items is moved to the first primary free list data structure when the first secondary free list data structure includes a number of processor-specific items below the first threshold, wherein at least one item in the global list data structure is selectively allocated to all of the primary free list data structures to effect load-balancing; and
upon determination, for a second of the free list data structure pairs, that a corresponding second primary free list data structure includes a number of processor-specific items exceeding the second threshold, at least one of the processor-specific items in the second primary free list data structure having the number of processor-specific items exceeding the first threshold is moved to a corresponding second secondary free list data structure, wherein a new item is pushed into the second primary free list data structure, wherein at least a portion of processor-specific items in the second secondary free list data structure is moved to the global free list data structure.

2. A computer program product as in claim 1, wherein the operations further comprise:
moving to the global free list processor-specific items allocated to the first of the free list data structures, when the number of calculated processor-specific items in the first free data structure exceeds half of the first threshold; and
moving to the global free list processor-specific items allocated to the second of the free list data structures, when the number of calculated processor-specific items in the second free data structure exceeds half of the second threshold.

3. A computer program product as in claim 1, wherein the items in the free list data structures represent free blocks in memory allocation algorithms.

4. A computer program product as in claim 1, wherein the items in the free list data structures comprise arbitrary objects.

5. A computer program product as in claim 1, wherein each free list data structure comprises a last-in-first-out (LIFO) queue.

6. A non-transitory computer program product storing instructions that, when executed by at least one programmable processor, cause the at least one programmable processor to perform operations comprising:
   maintaining, in a multi-processor computing system, a plurality of free list data structures implemented in a dynamic memory, each free list data structure corresponding to a different processor of the multi-processor computing system, each free list data structure comprising an ordered queue of processor-specific items assigned to a corresponding processor of the multi-processor computing system, wherein each processor has a primary free list data structure and a secondary free list data structure;
   calculating a number of processor-specific items allocated to each free list data structure;
   moving processor-specific items allocated to the free list data structures to a global free list queue when a number of processor-specific items within a corresponding free list data structure exceeds a first threshold; and
   re-assigning items in the global free list queue to free list data structures having a number of processor-specific items below a second threshold;
   the first and second thresholds being determined based on a number of items in each free list data structure;
   wherein
      upon determination that a first item is present in the first primary free list data structure, then the first item is allocated;
      upon determination that the first item is not present in the first primary free list data structure and the first secondary free list data structure includes at least two processor-specific items, at least a portion of the processor-specific items in a corresponding first secondary free list data structure are moved to the first primary free list data structure, wherein at least one item from a global list data structure queue of items is moved to the first primary free list data structure when the first secondary free list data structure includes a number of processor-specific items below the first threshold, wherein at least one item in the global list data structure is selectively allocated to all of the primary free list data structures to effect load-balancing; and
      upon determination, for a second of the free list data structure pairs, that a corresponding second primary free list data structure includes a number of processor-specific items exceeding the second threshold, at least one of the processor-specific items in the second primary free list data structure having the number of processor-specific items exceeding the first threshold is moved to a corresponding second secondary free list data structure, wherein a new item is pushed into the second primary free list data structure, wherein at least a portion of processor-specific items in the second secondary free list data structure is moved to the global free list data structure.

7. A computer program product as in claim 6, wherein the items in the free list data structures represent (i) free blocks in memory allocation algorithms, (ii) free internal state objects of job worker queues, and/or (iii) free I/O control blocks of an I/O subsystems.

8. A computer program product as in claim 6, wherein the items in the free list data structures comprise arbitrary objects.

9. A computer program product as in claim 6, wherein each free list data structure comprises a last-in-first-out (LIFO) queue.

10. A non-transitory computer program product storing instructions that, when executed by at least one programmable processor, cause the at least one programmable processor to perform operations comprising:
   maintaining, in a multi-processor computing system, a plurality of free list data structure pairs implemented in a dynamic memory, each free list data structure pair comprising a primary free list data structure and a secondary free list data structure and corresponding to, and striped by, a different processor of the multi-processor computing system, each free list data structure comprising an ordered queue of processor-specific items assigned to a corresponding processor of the multi-processor computing system;
   determining, for a first of the free list data structure pairs, whether a first item is present in a corresponding first primary free list data structure;
   allocating the first item if the first item is present in the first primary free list data structure;
   wherein
      upon determination that the first item is not present in the first primary free list data structure and the first secondary free list data structure includes at least two processor-specific items, at least a portion of the processor-specific items in a corresponding first secondary free list data structure are moved to the first primary free list data structure, wherein at least one item from a global list data structure queue of items is moved to the first primary free list data structure when the first secondary free list data structure includes a number of processor-specific items below a first threshold, wherein at least one item in the global list data structure is selectively allocated to all of the primary free list data structures to effect load-balancing; and
      upon determination, for a second of the free list data structure pairs, that a corresponding second primary free list data structure includes a number of processor-specific items exceeding a second threshold, at least one of the processor-specific items in the second primary free list data structure having the number of processor-specific items exceeding the first threshold is moved to a corresponding second secondary free list data structure, wherein a new item is pushed into the second primary free list data structure, wherein at least a portion of processor-specific items in the second secondary free list data structure is moved to the global free list data structure;
   the first and second thresholds being determined based on a number of items in each free list data structure.

11. A computer program product as in claim 10, wherein the items in the free list data structures represent (i) free blocks in memory allocation algorithms, (ii) free internal state objects of job worker queues, and/or (iii) free I/O control blocks of an I/O subsystems.

12. A computer program product as in claim 10, wherein the items in the free list data structures comprise arbitrary objects.

13. A computer program product as in claim 10, wherein each free list data structure comprises a last-in-first-out (LIFO) queue.

14. A computer program product as in claim 1, wherein there are at least two free lists per processor.

15. A computer program product as in claim 14, wherein there is a primary free list for a processor and a processor specific item is first sought from the processor for the primary free list and, if such processor specific item is not available, then the processor specific item is sought from the other free list corresponding to the processor.

16. A computer program product as in claim 1, wherein the items in the free list data structures represent free internal state objects of job worker queues.

17. A computer program product as in claim 1, wherein the items in the free list data structures represent free I/O control blocks of an I/O subsystems.

18. A computer program product as in claim 2, further comprising:

- re-filling the first of the free list data structures processor-specific items previously allocated to the global free list, when the first of the free list data structures is empty; and
- re-filling the second of the free list data structures processor-specific items previously allocated to the global free list, when the second of the free list data structures is empty.

* * * * *